US006609687B1

(12) United States Patent
Leski

(10) Patent No.: US 6,609,687 B1
(45) Date of Patent: Aug. 26, 2003

(54) BASE SKIRT FOR A VENDING MACHINE

(75) Inventor: Raymond Leski, Toms River, NJ (US)

(73) Assignee: Mun Roe Chirnomas, Morris Township, NJ (US)

(*) Notice: Subject to any disclaimer, the term of this patent is extended or adjusted under 35 U.S.C. 154(b) by 0 days.

(21) Appl. No.: 10/127,919

(22) Filed: Apr. 23, 2002

(51) Int. Cl.[7] .............................................. F16M 11/24
(52) U.S. Cl. ................................ 248/188.2; 248/346.5; 248/673; 52/287.1; 52/DIG. 3
(58) Field of Search ........................ 248/346.01, 346.03, 248/346.04, 188.2, 188.1, 673, 677, 678, 205.3, 205.2, 346.5; 49/470, 496.1, 475.1; 5/493, 923, 663; 52/27, 287.1, DIG. 3, 782.24

(56) References Cited

U.S. PATENT DOCUMENTS

| | | | | | |
|---|---|---|---|---|---|
| 3,773,140 | A | * | 11/1973 | Mahajan et al. | 181/200 |
| 3,885,351 | A | * | 5/1975 | Imperial et al. | 49/501 |
| 4,122,632 | A | * | 10/1978 | Dixon | 49/470 |
| 4,903,723 | A | * | 2/1990 | Sublett | 137/312 |
| 5,099,873 | A | * | 3/1992 | Sanchez | 137/312 |
| 5,452,739 | A | * | 9/1995 | Mustee et al. | 137/312 |
| 5,733,397 | A | * | 3/1998 | McDaniel | 156/66 |
| 5,883,300 | A | * | 3/1999 | Johnson | 73/40 |
| 6,035,855 | A | * | 3/2000 | Faries, Jr. et al. | 128/849 |
| 6,151,731 | A | * | 11/2000 | Saparow | 5/493 |
| 6,266,930 | B1 | * | 7/2001 | Kitabatake | 52/27 |
| 6,427,966 | B1 | * | 8/2002 | Blumenschein | 248/678 |

* cited by examiner

*Primary Examiner*—Leslie A. Braun
*Assistant Examiner*—A. Joseph Wujciak, III
(74) *Attorney, Agent, or Firm*—Lawrence C. Edelman, Esq.

(57) ABSTRACT

Apparatus for sealing a gap formed between the floor or other supporting surface and the base of a vending machine, which apparatus prevents the accumulation of debris, etc. under the base of the machine.

26 Claims, 3 Drawing Sheets

BASE SKIRT FOR A VENDING MACHINE

SUMMARY OF THE INVENTION

The present invention provides a base skirt for sealing about the base perimeter of a vending machine so as to keep dirt and other debris from accumulating underneath the machine.

BRIEF DESCRIPTION OF THE DRAWINGS

The accompanying drawings, which are incorporated herein and constitute part of this specification, illustrate embodiments and details of the invention, and together with the general description given above and the detailed description given below, serve to explain the features of the invention.

DETAILED DESCRIPTION OF THE PREFERRED EMBODIMENTS

Figure 1:
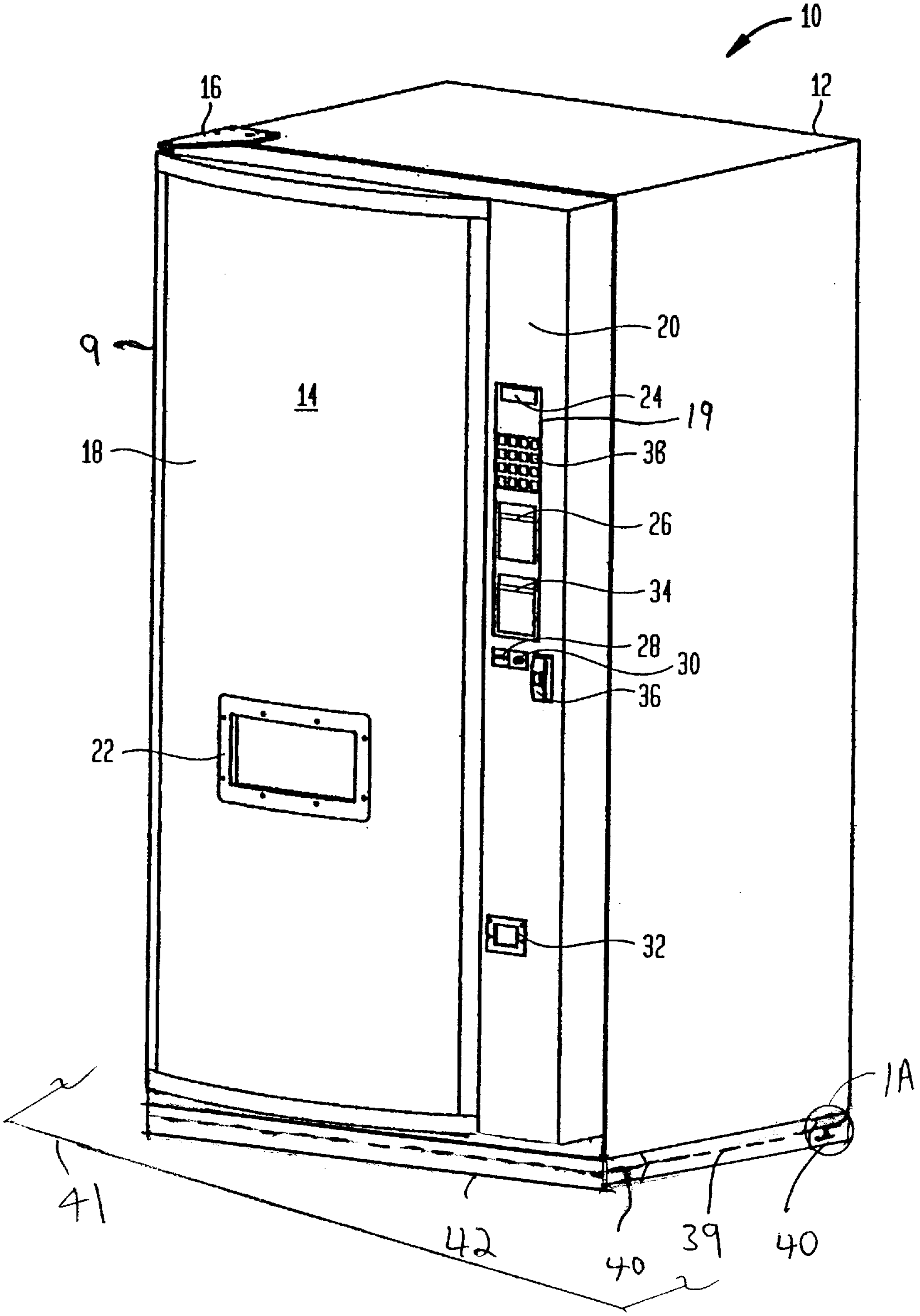
FIG. 1 is a perspective view of a vending machine useful for illustrating one embodiment of a base skirt-constructed and operating in accordance with the principles of the present invention.

FIG. 1 illustrates a perspective view of a vending machine 10 for illustrating one embodiment for an apparatus that is constructed and operates according to the present invention. Vending machine 10 includes a main cabinet 12 and a front door 14 mounted on a hinge 16 for providing access to the interior of the vending machine for servicing (refilling it with articles, maintenance, etc.). Note, in a further vending machine embodiment, a service door or access port to the interior of cabinet 12 could be positioned anywhere on or as a part of cabinet 12.

In FIG. 1, front door 14 is shown in a closed position, forming an enclosure with main cabinet 12, the interior of which various known components of vending machine 10 are housed, for storing and dispensing the items which are stored therein.

Front door 14 includes a convex-shaped display face panel 18 (commonly referred to as a "bubble" front); adjacent a flat section 20, however, these particular shapes are not necessary for the invention. For example, convex shaped display face panel 18 could be flat. Display face panel 18 is attached to the front of door 14 via a perimeter frame 9 of conventional design. In the illustrated embodiment the display face panel 18 is back-lit using fluorescent bulbs, not shown, to enhance the visibility of its graphics. Display panel 18 typically has brand name and/or logo graphics pre-printed or screened on an interior facing side thereof, and may even include graphics which illustrate the individual articles that are vendible by vending machine 10, as well as the price and/or selection information for the articles.

A customer retrieval area 22 is formed in the panel 18 on door 14 so that articles stored therein can be discharged to a user of vending machine 10. In a further embodiment, area 22 can be formed on flat section 20, or another wall of cabinet 12.

Various user interface components are mounted on flat section 20 of door 14. A customer display 24 may be a conventional fluorescent or LED display panel for displaying various items of information to a user of machine 10, such as feedback to the user of the selection made, the amount of payment tended, and if the product is sold out or being vended. For accepting payments, a bill acceptor slot 26 accepts paper money into a conventional bill acceptor mechanism (mounted inside machine 10 so as to have its user interface portion extend through an opening 19 in flat section 20) for purchasing articles or for making change. A coin insertion slot 28 accepts coins into a conventional coin changer (also mounted inside machine 10 so as to have its user interface portion extend through opening 19) for purchasing articles or for making change. A coin return actuator 30 comprises a conventional push-button mechanism for activating a coin return portion of the coin changer mechanism which, upon actuation returns coins inserted by the current user, to a coin return well 32. The coin return portion of the coin changer mechanism also provides change to the coin return well 32 either in response to the purchasing of articles or for making change for paper money or larger coins. A credit/debit card slot 34 accepts a plastic credit/debit card inserted into a conventional card reader mechanism (also mounted inside machine 10 so as to have its user interface portion extend through opening 19) for allowing a user to pay for purchases via credit/debit cards. A door handle/lock mechanism 36 enables front door 14 to be secured so that it cannot be opened without a key. For allowing user selections, display panel 18 may include graphics, as noted above, which indicates the various articles vendible by the machine, as well as their associated price and a unique selection number. A conventional keypad push-button mechanism 38 is provided for enabling a user to select a desired article from vending machine 10. Alternatively, push-button mechanism 38 could include an individual push button for each article selection, as well known. In a further embodiment a user operated touch screen could replace pushbutton mechanism 38 and display 24.

Although the interior of machine 10 is not shown in FIG. 1, machine 10 includes, as is typically for vending machines, a storage area for storing articles to be vended, and a dispensing arrangement for bringing a selected one of the stored articles to the customer retrieval area 22. Such dispensing arrangements typical comprise an article releasing gate mechanism at the discharge end of a product storage chute (such as used in conventional soda machines, or a spiral wire (as found on what are conventionally referred to as glass front spiral dispensers) commonly used for dispensing, for example, various other types of food items. Note, however, no particular dispensing arrangement is required for the present invention.

Furthermore, although vending machine 10 is illustrated to include the above described user interface components, in a more minimalist embodiment of the invention, most, if not all, of these user interface components could be omitted, and the dispenser could in fact be controlled from a remote location, with or without a local payment system. Such details are also not important to the present invention.

In general, the articles to be dispensed can include various consumer products. Preferably, the articles can be food or beverages (e.g., bags of snacks, packs of gum, candy bars, ice cream novelties, individual serving size pizzas, cans of carbonated beverages, containers of juice, etc.), personal hygiene items (e.g., combs and hair brushes, lip balm, razors, bandages, etc.), office supplies (e.g., pens and pencils, staples, note pads, tape, pre-paid), etc. Of course, it is possible for the machine 10 to store and vend other types of goods and services (e.g., telephone calling cards, cinema tickets, etc.).

The machine 10 may or may not include various types of equipment to prepare the articles for vending. For example, the machine 10 can include refrigeration equipment to keep certain articles cool or frozen. The machine 10 can also include heating equipment, e.g., a microwave oven, to warm certain articles.

The cabinet 12 for machine 10 can have a variety of arrangements including a free standing cabinet having any one of several particular shapes, although a generally rectangular or square shape is conventional. Conventionally, cabinet 12 may have mounted at its base 39 four spaced legs 40 (or other types of supports), which may be adjustable, for supporting machine 10 on a floor 41 and possibly allowing it to be leveled upon installation at a new location.

In view of the fact that the construction and operation of vending machines of this type is widely known, no further description of how to make and use a vending machine is deemed necessary.

With such a device, during normal machine operation, many articles are vended via area 22, and quite often when the articles comprise food items, the user opens the dispensed articles right at the machine 10. Such activities, among other activities occurring in the vicinity of the vending machine, tends to result in food and/or other debris accumulating around, at or near the base 39 of machine 10. Such accumulation can lead to a possible health/safety issue. In fact, the National Automatic Merchandising Association (NAMA) has issued standards and guidelines, such as the NAMA Standard for the Sanitary Design and Construction of Food and Beverage Vending Machines, which deals with issues such as these.

It is an object of the present invention to mitigate, and in fact substantially prevent, such incremental build up of debris at and/or under the machine, and in the course of so doing, meet various sanitary design standards, such as those promulgated by NAMA.

Accordingly, in accordance with one aspect of the present invention, a barrier 42 is provided, having a longitudinal portion attached in a sealing manner about the perimeter of base 39 and a lateral portion extending from base 39 towards the floor 41 so as to bridge, and thereby seal off, any space between base 39 and the floor 41. Connected in this manner, barrier 42 forms a continuous barrier tending to prevent the passage and/or build-up of debris underneath cabinet 12.

Figure 2:
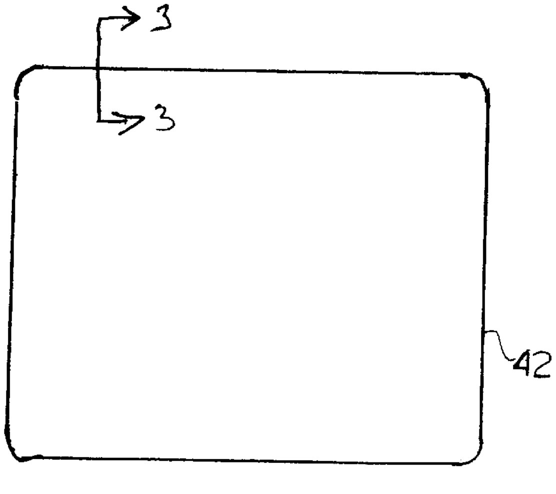
FIG. 2 is a simplified top view of the base skirt shown in FIG. 1.

FIG. 2 illustrates one embodiment for barrier 42, which may effectively comprise a continuous strip of semi-elastic material, such as a rubber or vinyl.

Figure 3:
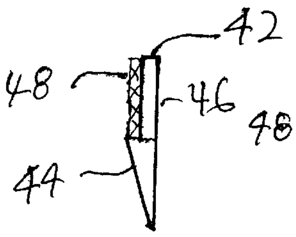
FIG. 3 is a cross-section side view of the base skirt shown in FIG. 1.

FIG. 3 illustrates one embodiment for the cross-section of barrier 42, which may have a thicker cross-section at the beginning of its bottom half 44 than at its top-half 46. Manufactured in this way, barrier 42 can be stretched about the perimeter of base 39, starting at the top or bottom of machine 10 and then positioned so that top-half 46 surrounds the bottom wall portions of base 39, and the lower edge of bottom-half 44 is flush with the floor 41 which supports machine 10.

The thinner portion 42 bends and stretches so as to tightly follow around the cornerss of base 39, while the bottom portion 44 is thick enough to maintain the shape of the corners.

Figure 1A:
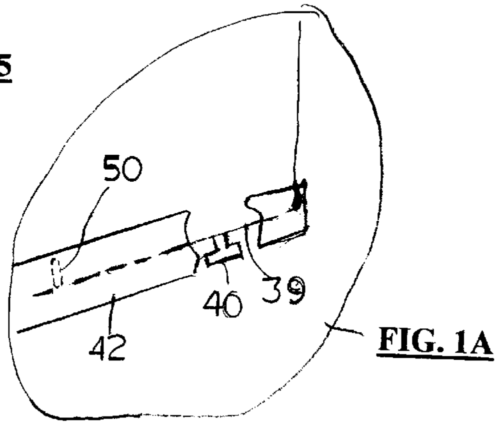
FIG. 1A is a simplified detailed view of a portion of the base skirt of FIG. 1.

The top-half 46 is attached to the vertical sidewalls of machine 10 using, in a preferred embodiment, an adhesive pre-assembled to the elastic strip, such as a double sided adhesive strip. Alternatively, barrier 42 could be attached to base 39 using any other type of attaching technique, alone or in combination with a pre-assembled adhesive strip, such as glue, screws, a clamp mechanism, etc. In this regard, for example, it is noted that since in one embodiment legs 40 have an adjustable height, it may be desirable to provide vertically oriented slotted holes 50 (shown in FIG. 1A) in the sidewall of base 39, which are dimensioned for allowing vertical adjustment of barrier 42 when using, for example, self-tapping screws, not shown, for attaching barrier 42 to the base 39.

Figure 4:
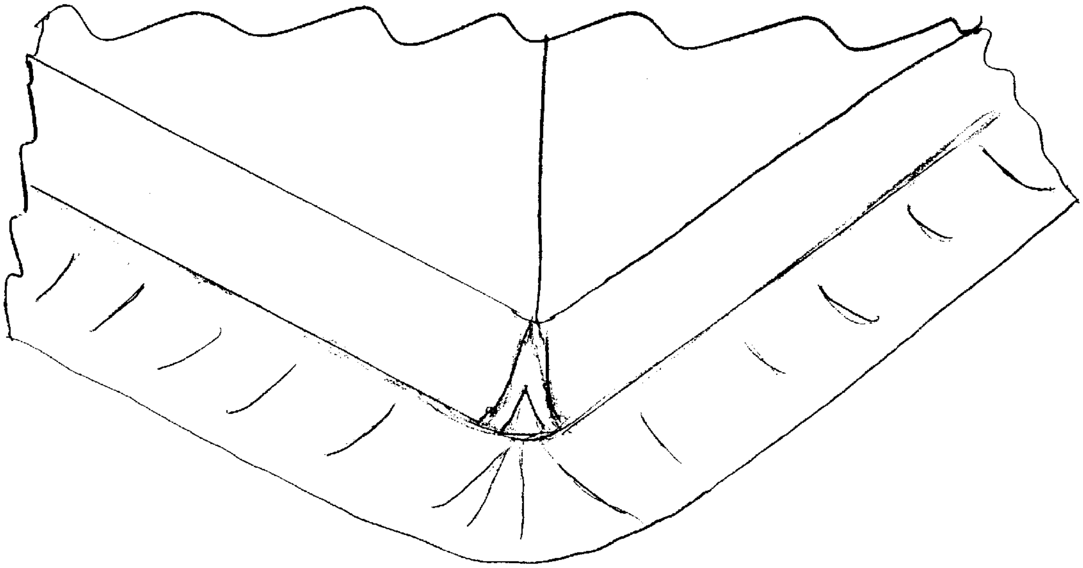
FIG. 4 illustrates a close-up view of a portion of the base skirt of FIG. 1.

Although the bottom 44 of barrier 42 is thick enough to maintain the shape of the corners, it is also preferable that it also be flexible enough so as to flex when making contact to the floor 41, and thereby assist in making a good seal to the floor. In this regard, see the illustration of such a flexible barrier 42 shown in FIG. 4.

Figure 5:
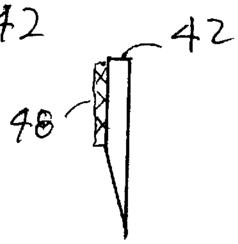
FIG. 5 illustrates a further embodiment of the base skirt of the invention.
Figure 6:
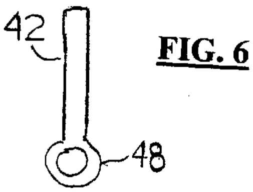
FIG. 6 illustrates an even further embodiment of the invention.

FIGS. 5 and 6 illustrate further embodiments for the cross-section of barrier 42, where the barrier 42 of FIG. 5 has the same thickness for the top and bottom portions 46 and 44, and the barrier 42 of FIG. 6 has a bottom part 44 shaped so as to have a flexible bead 48 at the end thereof, which bead is easily deformable so as to further assist the making of a good seal with the floor 41. Many other cross-sections are considered to be within the scope of the present invention, and are a matter of design choice, depending upon the particular environment for the invention.

In accordance with a further aspect of the present invention, barrier 42 may not comprise a continuous strip, but instead may be a linear strip, which is merely formed into a continuous strip about the base 39 by aligning one end of the strip with the other, opposite end (as if the barrier shown in FIG. 2 was a linear strip, which had its two ends joined at line 3—3.) This type of embodiment for the present invention would find particular use in an environment where, for example, the ability to easily position a continuous strip 42 about base 39 would be difficult. Attachment of this type of barrier 42 could use the same techniques disclosed for the above embodiments.

While the present invention has been disclosed with reference to certain embodiments, numerous modifications, alterations and changes to the described embodiments are possible without departing from the sphere and scope of the present invention, as defined above, and in the following claims.

For example, it is noted that the invention described herein is, quite obviously, not limited to any specific shape for the housing or base of the vending machine, nor any specific type of article retrieving/transporting/dispensing device. For example, other types of suitable pickup devices include a mechanical claw or scoop, a magnetic attracting device, a portable suction generator, etc. Furthermore, the base may have legs of fixed length, instead of being adjustable, and the barrier may be formed partially or even wholly of a non-elastic material, instead of elastic material. The barrier could be formed of opaque or even transparent or semi-transparent material.

The claims which follow provide further details concerning the elements, actions, and/or steps that are contemplated, as noted above, as falling within the scope of the methods and/or apparatus of the present invention.

What is claimed is:

1. A vending machine apparatus comprising:

a housing defining an exterior and an interior for the machine, said housing including a base for positioning said vending machine in a spaced manner a given distance above a supporting surface during normal operation;

a barrier having a longitudinal portion attached in a sealing manner about the perimeter of the base and a lateral portion extending substantially said given distance from the base toward the supporting surface so as to bridge the space below the base and form a continuous barrier, said continuous barrier tending to prevent the passage of debris underneath said machine, and further including an attaching device for securing the barrier about the perimeter of the base, wherein the attaching device comprises a threaded member, adapted to enter and become secured to an elongate slot formed in the base, the slot having a longitudinal axis in the direction of adjustment of the adjustable legs.

2. The apparatus of claim 1, wherein said barrier comprises a strip of flexible material.

3. The apparatus of claim 1, wherein said barrier comprises a continuous strip.

4. The apparatus of claim 1, wherein the attaching device comprises adhesive.

5. The apparatus of claim 4, wherein the attaching device comprises a double sided adhesive strip positioned longitudinally along the barrier.

6. The apparatus of claim 1, further including adjustable height legs attached to the base for leveling the housing on the supporting surface.

7. The apparatus of claim 1, wherein said barrier has a first type cross-section for a longitudinal top portion thereof which is attached in a sealing manner about the perimeter of the base, and the longitudinal bottom portion thereof has a second type cross-section.

8. The apparatus of claim 7, wherein said longitudinal top portion of the barrier has a thinner cross-section than the longitudinal bottom portion.

9. The apparatus of claim 7, wherein said longitudinal top portion of the barrier has a uniform cross-section, and the longitudinal bottom portion of the barrier has a non-uniform cross-section.

10. The apparatus of claim 9, wherein the longitudinal bottom portion of the barrier has a tapered cross-section.

11. The apparatus of claim 9, wherein the longitudinal bottom portion of the barrier has a circular cross-section at that portion of the barrier adapted for sealing to the supporting surface.

12. The apparatus of claim 11, wherein the circular cross-section is hollow.

13. A vending machine apparatus comprising:

a housing defining an exterior and an interior for the machine, said housing including a base for positioning said vending machine in a spaced manner a given distance above a supporting surface during normal operation; and a barrier having a longitudinal top portion attached in a sealing manner about the perimeter of the base and a lateral portion extending substantially said given distance from the base toward the supporting surface so as to bridge the space below the base and form a continuous barrier, said continuous barrier tending to prevent the passage of debris underneath said machine, wherein the barrier has two different longitudinal cross-sections, one cross-section is thick and another cross-section is thinner in comparison to the one cross-section.

14. The apparatus of claim 13, wherein the one cross-section is uniform and the other it is not uniform.

15. The apparatus of claim 14, wherein the not uniform cross-section is tapered.

16. The apparatus of claim 14, wherein the not uniform cross-section as has a circular cross-section where it meets the supporting surface.

17. The apparatus of claim 16, wherein the circular cross-section is hollow.

18. A vending machine apparatus comprising:

a housing defining an exterior and an interior for the machine, said housing including a base for positioning said vending machine in a spaced manner a given distance above a supporting surface during normal operation; and a barrier having a longitudinal portion attached in a seating manner about the perimeter of the base and a lateral portion extending substantially said given distance from the base toward the supporting surface so as to bridge the space below the base and form a continuous barrier, said continuous barrier tending to prevent the passage of debris underneath said machine, wherein the barrier has two different longitudinal cross-sections, one cross-section is uniform and another is not uniform.

19. The apparatus of claim 18, wherein the not uniform cross-section is tapered.

20. The apparatus of claim 18, wherein the not uniform cross-section is hollow.

21. The apparatus of claim 18, wherein the not uniform cross-section has a circular cross-section where it meets the supporting surface.

22. The apparatus of claim 21, wherein the circular cross-section is hollow.

23. A vending machine apparatus comprising:

a housing defining an exterior and an interior for the machine, said housing including a base for positioning said vending machine in a spaced manner a given distance above a supporting surface during normal operation; and a barrier having a longitudinal portion adapted to be attached in a sealing manner about the perimeter of the base and a lateral portion adapted to extend substantially said given distance from the base toward the supporting surface so as to bridge the space below the base and form a continuous barrier which tends to prevent the passage of debris underneath said machine, wherein the longitudinal portion of the barrier and the lateral portion of the barrier each have a differently shaped cross-section, the cross-section of the lateral portion of the barrier being easily deformable in comparison to the cross-section of the longitudinal portion of the barrier, so that the lateral portion of the barrier can deform so as to form a sealing engagement with the supporting surface.

24. The apparatus of claim 23, wherein the longitudinal portion of the barrier has a uniform cross-section, and the lateral portion of the barrier has a non-uniform cross; section.

25. The apparatus of claim 23, wherein the lateral portion of the barrier has a circular cross-section where it meets the supporting surface.

26. The apparatus of claim 25, wherein the circular cross-section is hollow.

* * * * *